May 28, 1963 E. WELLER 3,091,165
PHOTOGRAPHIC CAMERA
Filed Aug. 26, 1959 2 Sheets-Sheet 1

INVENTOR
Erwin Weller

BY Munn, Liddy, Daniels & March
ATTORNEYS

May 28, 1963 E. WELLER 3,091,165
PHOTOGRAPHIC CAMERA

Filed Aug. 26, 1959 2 Sheets-Sheet 2

INVENTOR
Erwin Weller

BY
Munn, Liddy, Daniels & March
ATTORNEYS

United States Patent Office 3,091,165
Patented May 28, 1963

3,091,165
PHOTOGRAPHIC CAMERA
Erwin Weller, Calmbach (Enz), Germany, assignor to Alfred Gauthier G.m.b.H., Calmbach (Enz), Germany, a corporation of Germany
Filed Aug. 26, 1959, Ser. No. 836,300
Claims priority, application Germany, Sept. 2, 1958
1 Claim. (Cl. 95—64)

This invention relates to photographic cameras which are equipped with depth-of-field or depth-of-focus indicators, and more particularly to wherein such indicators are in the form of oppositely turnable rings having indicator marks which cooperate with a distance scale.

The invention concerns improvements in the camera described and claimed in the copending application of Waldemar T. Rentschler, Serial No. 710,279, filed January 21, 1958, now Patent No. 2,975,692. In the camera of this copending application there is provided an advantageous device for semi-automatically indicating the depth of focus, which device is constituted of two oppositely turnable indicator rings which are automatically actuated in response to adjustment of the diaphragm. The rings have indicator marks cooperable with a range or distance scale, and there is a gear drive comprising a segment gear and a gear train, the latter being drivingly connected to the oppositely turnable rings so that movement of the segment gear drives the rings in opposite directions. The segment gear is in the form of an arcuate arm, and has a narrow extension arm carrying a cam follower which is engaged with a cam connected to the diaphragm mechanism, thereby to effect a movement of the gear segment as the diaphragm is adjusted. The gear segment, together with the gear train are all of small, commensurate size and are disposed wholly to one side of the shutter axis and the picture-taking aperture.

The device of this copending application is distinguished by a simple, structural design and good adaptability to the camera structure as well as being applicable to all different types of diaphragm mechanisms. More particularly, both the control cam and its connection with the segment gear, as well as the gear train may be designed and constructed with great freedom, since there are no critical requirements involved.

An object of the present invention is to provide a novel and improved device for semi-automatically indicating the depth of focus, as in the case of the camera of the above-referred-to copending application, which not only has the above-stated advantages with respect to the structure and mode of operation, but is further distinguished by a small number of structural parts or members, a simple arrangement and assembly of the said members, and which requires a relatively small space in the shutter housing, especially in the diretcion of the optical axis.

In accordance with the invention, the above object is attained by arranging the two oppositely turnable indicator rings and a segment gear constituting a part of the gear drive so that these three parts are movable in parallel planes of motion, with the pivotal axis of the segment gear being located eccentrically with respect to the axis of rotation of the oppositely turnable rings; the segment gear being preferably constituted as an annulus and having its toothed portion disposed with respect to the axis of the turnable rings, approximately diametrically opposite to its pivotal axis.

A camera constructed in accordance with the inventive idea as above set forth has a number of important advantages. First, only a small number of structural members is required in constructing the device. This is due to the fact that the pivotal axis of the segment gear is spaced a relatively great distance from the toothed portion of the gear, thereby enabling a large movement of said toothed portion to be obtained by a relatively small movement of the cam followers and cams and relatively small slope of the cams. In addition, the said wide spacing between the pivotal axis and the toothed portion of the segment gear enables the cam followers which are carried by the gear to be located an appreciable distance from the said pivotal axis, whereby relatively small or light forces are required to be exerted on the cam followers by the cams during adjustment of the diaphragm. Moreover, since the planes of motion of the oppositely turnable rings and the segment gear are arranged parallel to each other, and since the strength of these parts need not be very great, the parts may be made small in axial dimension, and may be made to occupy but a small space, which is of considerable advantage where the dimensions of the camera are to be kept small.

A particularly advantageous structure of the depth-of-field indicator device, as regards production of the pieces and the arrangement and assembly of the same is had where the oppositely turnable indicator rings, the cam carrier member, and the segment gear are all constituted as annular members. With such annular construction, the device of the present invention may be advantageously arranged wholly within an intra-lens shutter housing or an objective lens housing in such a manner that, on the one hand, the picture-taking opening is not obstructed while, on the other hand, the external dimensions of the shutter or lens housing need not be changed.

The annular gear-actuating cam type of control as provided herein may be easily and economically, accurately fabricated by providing two cam followers on the segment gear, by which movement of the gear is effected in response to adjustment of the diaphragm, each of said cam followers being cooperable with a cam surface or edge which is provided on the outer periphery of an annular cam carrier positioned concentrically with respect to the axis of rotation of the indicator rings.

For the purpose of enabling the device of the present invention to be incorporated in a minimum amount of space with the fewest possible parts, all transmission gears which are provided between the indicator rings and the segment gear can be positioned on a single or common shaft or sleeve which is arranged to be parallel to the axis of rotation of the indicator rings, transmission gears being rigidly carried on the shaft or sleeve.

An embodiment of the invention, incorporated in a photographic intra-lens shutter, is illustrated in the accompanying drawing and described in the following specification. The above-mentioned advantages of the invention, as well as other advantages resulting therefrom will be explained in detail.

Figure 3:
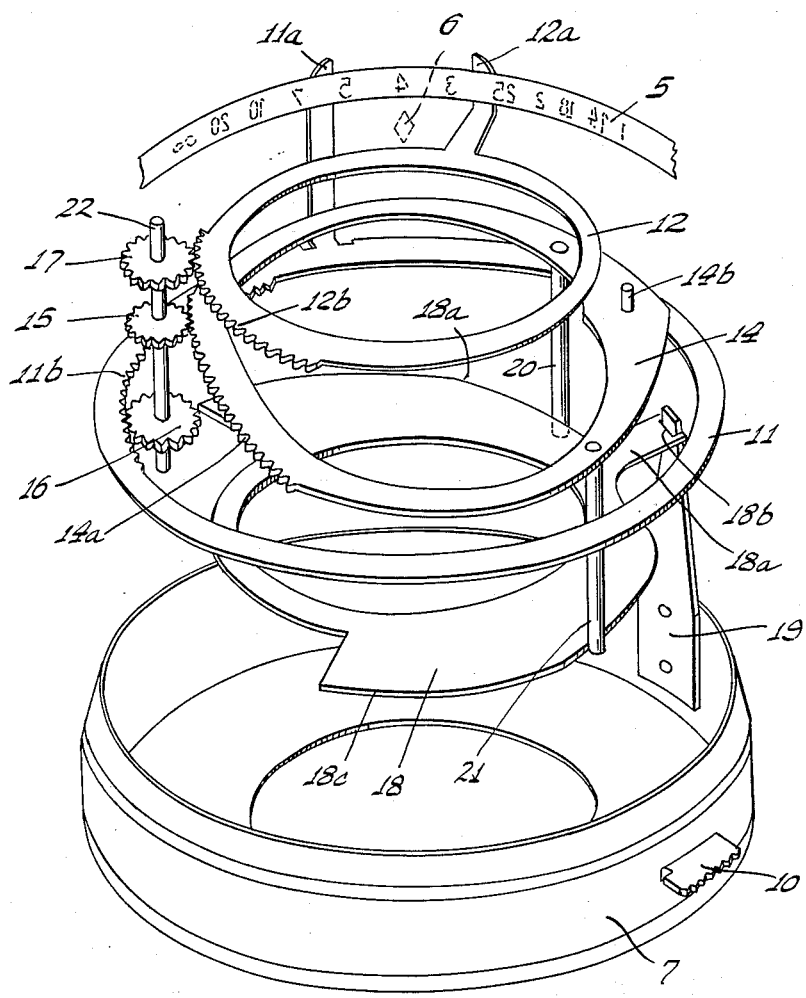

FIG. 3 reveals a modification of the invention, being an exploded perspective view showing the individual members of the depth-of-focus indicating device, and illustrating the cooperable relationship of the members. For the sake of clarity of illustration, the various members have been shown in widely spaced relation to each other.

Figure 1:
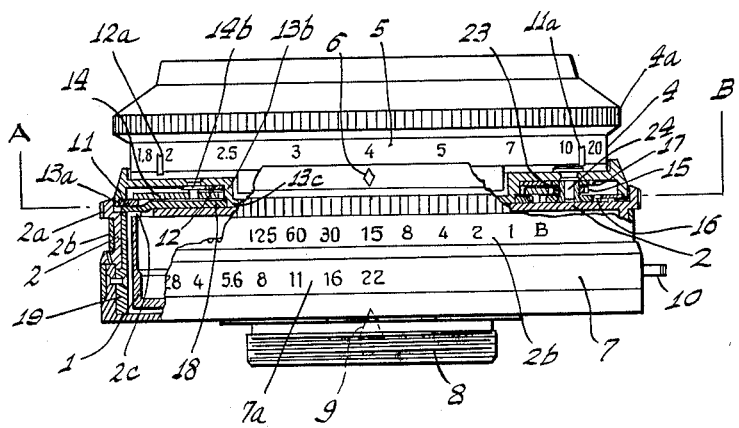
FIGURE 1 is a view partially in section and partially in side elevation of a photographic intra-lens shutter having incorporated therein the automatic depth-of-focus indicating device as provided by the invention.
Figure 2:
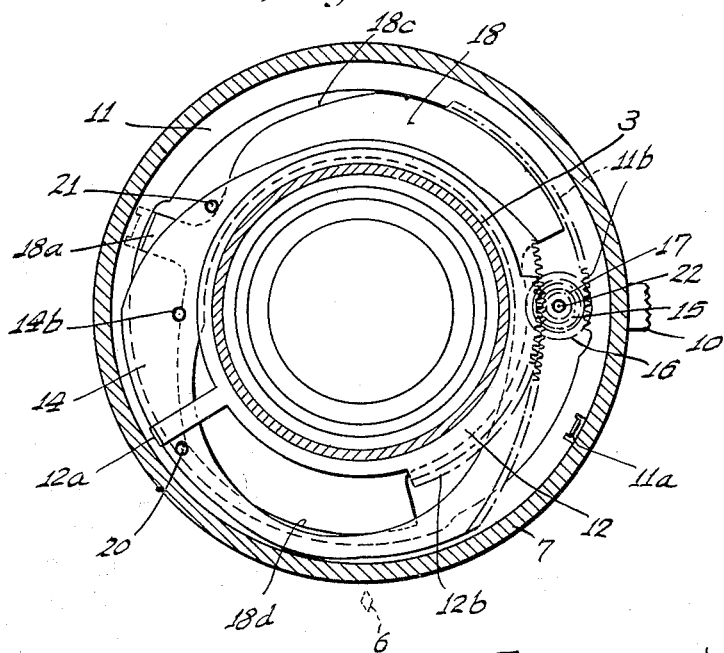
FIG. 2 is a transverse sectional view, taken on the line A—B of FIG. 1. This figure illustrates in particular the arrangement and positioning of the segment gear, the indicator rings, the cam ring, and the transmission gears.

Referring now particularly to FIG. 1, the side wall of the intra-lens shutter housing is indicated by the numeral 1. Forwardly of the side wall 1 of the housing there is located a speed setting or adjusting ring 2, provided with knurling 2a to facilitate its being grasped and adjusted. The speed setting ring 2 has a scale number 2b and is turnably mounted for movement in a path concentric with the axis of the shutter by means of a fixed hub or tube 3 (FIG. 2). As is well understood, the tube 3 may be carried by the shutter base plate, not shown, and may have well-known means for holding the speed setting ring 2 against axial movement while permitting unrestricted turning movement thereof.

In addition, a range adjusting ring 4 is mounted on the front side of the intra-lens shutter, for adjusting or focusing a front lens which is also well known per se and is not shown in the drawing. The ring 4 is provided with knurling 4a, and carries a range scale 5 which is adjustable with respect to a stationary mark 6 carried by the intra-lens shutter.

A diaphragm adjusting ring 7 is disposed at the back of the intra-lens shutter, being radially guided in a well-known manner on a flange or collar of a nozzle 8 projecting from the bottom of the shutter housing. The diaphragm ring 7 is secured against axial movement by any suitable means. A diaphargm scale 7a is provided on the periphery of the setting ring 7 and cooperates with a fixed index mark 9 of the camera, said mark being shown in broken outline in FIG. 1. Also cooperable with the index mark 9 is the time-of-exposure or speed scale 2b. In order to effect an adjustment of the diaphragm and speed setting rings to enable a speed-diaphragm selection, the said rings may be coupled to each other by means of a well-known coupling which is not shown in detail in the drawing. The operation of such coupling may be effected by actuation of a handle member 10 mounted on the diaphragm setting ring 7, whereby the two setting rings may be disconnected for individual adjustment.

For the purpose of automatically indicating the depth of focus, there are provided two oppositely turnable indicator rings 11 and 12, which are actuated in response to adjustment of the diaphrgm and which cooperate with the range scale 5, the ring 11 being rotatably positioned on a collar 13a of a front plate 13 whereas the ring 12 bears on a collar 13b of the said front plate. The rings 11 and 12 have pointers 11a and 12a respectively, arranged to extend in front of or over the range scale 5 as clearly shown in FIG. 3. Between the pointers 11a and 12a the correct depth of focus reading can be read off, on the scale 5.

The gear drive by which the indicator rings 11 and 12 are actuated includes a segment gear indicated by the numeral 14. In accordance with the present invention, the plane of motion of the segment gear 14 is parallel to the planes of motion of the indicator rings 11 and 12, and also the toothed portion 14a of the segment gear is arranged with respect to the axis of rotation of the indicator rings to be approximately diametrically opposite its pivotal axis 14b. The segment gear 14 is also preferably constituted as a relatively large annulus. The gear drive further comprises transmission gears 15, 16 and 17, the gear 15 meshing with the segment gear 14 as clearly seen in FIG. 3 whereas the gears 16 and 17 mesh with teeth 11b and 12b respectively of the indicator rings 11 and 12.

In the illustrated embodiment of the invention the adjusting movement of the diaphragm is transmitted to the pointer rings 11 and 12 by means of a connecting arm 19 which is attached to the diaphragm setting ring 7. The arm 19 projects through a slot 2c (FIG. 1) provided in the speed setting ring 2 and extending circumferentially of the same, and the arm 19 engages a fork 18b which is provided on a radially extending arm 18a of a cam carrier ring 18, the latter being rotatably mounted for movement about the optical axis of the shutter. The carrier ring 18 is held against axial movement and has a bearing on a collar 13c provided on the front plate 13, the said front plate being positioned on the bearing tube 3 so as to be centralized with respect to the optical axis, and being secured against axial movement by means of a usual type of threaded ring (not shown) on the one hand, and by engagement with the speed setting ring 2 on the other hand (which latter is also prevented from having axial movement).

In accordance with the present invention and constituting an important feature thereof, the segment gear 14 is constructed in the form of a large annulus, as is clearly shown in FIG. 3. This construction is of especial importance in those cases where the depth-of-focus device is arranged on an intra-lens shutter or on an objective (lens assembly). If the segment gear 14 were to be arranged at another location in the camera housing it could be constructed in the shape of a disk; however, by forming it as an annulus there is effected a substantial saving of material and space, with the resulting advantages of lower production costs, and a simplified assembly and mode of operation of the device. The annular design offers, in particular, the advantage of an excellent adaptation of the device to the crowded conditions prevailing inside intra-lens shutters and lens. For the best utilization of the space available, the segment gear may be of open instead of closed construction; this could be done by cutting away a portion of the segment gear either at one side of the toothed portion, or else at one side of the pivotal portion thereof.

For the purpose of actuating the segment gear 14 in response to adjustment of the diaphragm, the invention provides a pair of cam follower devices 20, 21 which are carried by the segment gear 14, the cam follower 20 cooperating with a cam surface or edge 18d on the carrier ring 18, whereas the cam follower 21 cooperates with a cam surface or edge 18c on the said carrier. The cam edges are provided on the outer periphery of the cam ring 18, and the latter is turnable about an axis which coincides with the axis of rotation of the indicator rings 11 and 12.

The cam follower devices as shown in the illustrated embodiment of the invention are constituted as cylindrical pins, which are fixedly attached to and carried by the segment gear 14. Instead of the said pins, which cooperate with the cam edges 18c, 18d, angularly bent flaps or tabs may be provided on the segment gear 14, as will be understood. The above cam follower structure as provided by the invention results in a particularly simple, overall arrangement of the indicating device, and effects a reduction in the number of structural members required.

Instead of actuating the segment gear 14 by means of two cam edges 18c and 18d and the two cam followers 21 and 20, the gear may be actuated by a single cam follower, extending into a cam slot or control groove provided on the cam ring 18. However, compared with this latter arrangement, the double cam follower organization as illustrated facilitates production and in addition is particularly suited to crowded conditions and small available space in shutters of the type illustrated.

As already stated above, the rotary motion of the segment gear 14 is transmitted to the indicator rings 11, 12 by means of the transmission gears 15, 16 and 17. In accordance with the invention, the said transmission gears are carried on a common shaft or sleeve, which is arranged to be parallel with the axis of rotation of the indicator rings 11 and 12, and the said three gears are fixedly secured to the shaft or sleeve to have concurrent turning movement.

FIGURE 3, which illustrates a modification of the invention, shows a simplified view of the positioning and location of the transmission gears on a solid shaft 22. In FIG. 1, on the other hand, which corresponds to a preferred embodiment of the invention, the gears are positioned on a sleeve 23 which rotates on a fixed pin 24 mounted on the face of the front plate 13.

The positioning of the transmission gears on a common shaft or sleeve in accordance with FIG. 1 or 3 also produces an advantageous construction of the depth of focus device by which there is reduced the number of structural members required and hence the cost of production. In addition the device as constructed in this manner is compact, and saving of space.

The device shown in the embodiment of the invention operates in the following manner:

The lens is set for distance or focused by turning the distance setting ring 4. The number of distance units so adjusted is indicated on the range or distance scale 5, by referring to the stationary mark 6.

The depth-of-focus range correlated with the viewing distance and with the adjusted diaphragm is now indicated by the spaced pointers 11a and 12a of the indicator rings 11 and 12, and the said depth-of-focus distance can be read on the scale 5, being indicated by the portion of the scale disposed between the said pointers.

If the diaphragm is readjusted, the movement of the diaphragm adjusting or setting ring 7 will be transmitted by means of the connecting arm 19 to the cam carrier ring 18, and hence by way of the cam follower pins 20 and 21 to the segment gear 14 whereby the latter will drive the transmission gears 15, 16 and 17. Since the gear 16 meshes with the internal teeth 11b of the indicator ring 11, and since the gear 17 meshes with the external teeth 12b of the indicator ring 12, these two rings will be driven in opposite directions, whereby a new depth of focus reading will be had on the scale 5, corresponding to the new diaphragm opening.

As with the depth-of-focus device set forth in the copending application above referred to the present invention is not limited to use in an intra-lens shutter as shown in the illustrated embodiment, but may be advantageously incorporated in cameras of every type wherein the diaphragm is adjustable to effect different sizes of apertures. The present device as provided by the invention for automatically indicating the depth of focus need not be arranged only in an intra-lens shutter, but may be mounted directly on the housing of a camera, or in the interior of a picture-taking lens. Regardless of the location, the device as constructed in accordance with the invention is distinguished by great compactness and the best possible utilization of the available space, and also by a relatively small number of structural members and simple fabrication of the same. Moreover, in their operation the structural members will be subjected to relatively low adjusting forces, which constitutes a further advantage of the device.

I claim:

In a photographic camera, a diaphragm adjusting ring, a depth of focus adjusting arrangement comprising two oppositely turnable pointer rings having segment gear teeth thereon, a transmission gear drive means operable in response to adjustment of the diaphragm ring for oppositely turning said turnable rings, indicating pointers respectively projecting from the respective oppositely turnable pointer rings, said indicating pointers thereby being moved oppositely with respect to each other, a depth of focus or range adjusting ring having a distance scale thereon, said indicating pointers being movable over said distance scale, an annular segment gear separate from said turnable pointer rings and constituting a part of said gear drive means, said two turnable pointer rings and the segment gear having parallel planes of motion, a fixedly located pivot means for said segment gear located eccentrically with respect to the axis of rotation of the turnable pointer rings, said segment gear being pivoted upon said eccentric pivot means and having a tooth portion formed about the eccentric pivot axis of the annular segment gear, said tooth portion being located diametrically opposite the fixedly located pivot means, said gear drive means operable in response to adjustment of said diaphragm adjusting ring further including a cam ring coaxially arranged with the turnable rings and having diametrically opposite cam edges, a connecting arm extending from the diaphragm ring to the cam ring to turn the cam ring therewith, cam follower pins projecting from the annular segment gear and respectively engaging the respective opposite cam edges of said cam ring and pinion drive gears engaging respectively the gear segments of the turnable pointer rings and the gear tooth portion of the segment gear, a common shaft having its axis parallel to the axis of the turnable pointer rings, said pinion drive gears being fixed to said common shaft.

References Cited in the file of this patent

UNITED STATES PATENTS

| | | |
|---|---|---|
| 2,342,819 | Priesmann | Feb. 29, 1944 |
| 2,901,956 | Werner | Sept. 1, 1959 |
| 2,916,980 | Schutz | Dec. 15, 1959 |
| 2,917,983 | Gebele et al. | Dec. 22, 1959 |
| 2,949,836 | Baab | Aug. 23, 1960 |